J. GATES.
Oiler.
No. 107,478.
Patented September 20, 1870.
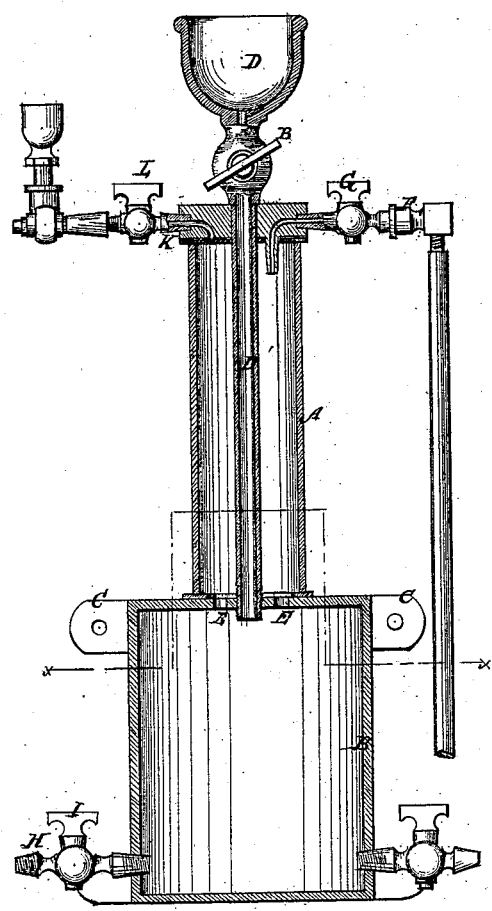
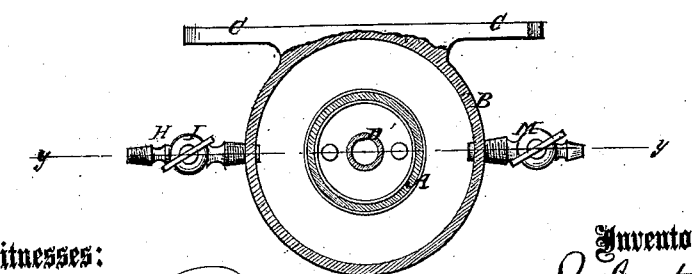
Witnesses:
Inventor:
J. Gates
per ——
Attorneys.

United States Patent Office.

JOHN GATES, OF PORTLAND, OREGON.

Letters Patent No. 107,478, dated September 20, 1870.

IMPROVEMENT IN LUBRICATORS

The Schedule referred to in these Letters Patent and making part of the same.

*To all whom it may concern:*

Be it known that I, JOHN GATES, of Portland, in the county of Multnomah and State of Oregon, have invented a new and improved Oiler; and I do hereby declare that the following is a full, clear, and exact description thereof, which will enable others skilled in the art to make and use the same, reference being had to the accompanying drawing forming part of this specification.

My invention relates to oilers, and consists in an improved construction of parts, which will be specified in the summary or claim at the end of the specification.

Figure 1 is a sectional elevation of my improved oiler, taken through the line $y\ y$, fig. 2.

Figure 2 is a horizontal section of the same, taken on the line $x\ x$ of fig. 1.

Similar letters of reference indicate corresponding parts.

A represents a hollow glass cylinder; and

B, a metallic vessel attached thereto, and provided with brackets C, or other means for attaching to any support.

The glass part is closed at the top, and provided with a filling-cup, D, with a tube, D', for passing through the cover, and preferably into the vessel B.

B' is a stop-cock in the pipe D'.

E represents passages from A to B.

F represents a pipe leading from the steam-boiler, or any other water-supply higher than the oil or under pressure, into the top of vessel A. It is provided with a cock, G.

H is another water-pipe connection attached to the vessel B, near the bottom, and provided with a cock.

K is the feed-pipe, leading from the top of the cylinder A to the place to be lubricated. It is provided with a cock, L.

M is a discharge-pipe.

The operation is as follows:

The vessels are filled with oil, or partly with oil and partly with water. The water, being the heavier, will go to the bottom, and the oil will float on it. If the feed is to be slow the cock G is opened, so as to let the water drop into the oil as fast as it is required to have the oil flow out. The latter will be expelled by the water, which will sink to the bottom of the oil.

If the part to be lubricated is above the vessel, the column of water should be of sufficient height to raise the oil.

If it is required to feed in jets, then I prefer to admit a corresponding jet of water through the pipe H at the bottom, for, if a considerable quantity of water be admitted at the top, it would be liable to mix with the oil flowing out of the feed-pipe.

This method of feeding admits of observing the quantity and regularity of the feed, as the water, dropping into the oil and falling to the bottom, may be distinctly seen through the glass.

When the oil is exhausted, the water in the vessel may be drawn off through the cock M, and a new supply of oil added, as at first.

I have shown the vessel B, in this example, merely as a convenient means of attaching the apparatus to any suitable support, but need not necessarily use it, as any other attachment for the glass vessel may be used.

The vessel may be made wholly of glass, if preferred, and a drip-cup may be attached to the bottom for securing the dripping oil.

For the slow feed the vessel may either be open, to expose the oil to the atmosphere, or closed. For feeding it in jets it should be closed.

Having thus described my invention,

I claim as new and desire to secure by Letters Patent—

The hollow glass cylinder A, vessel B, tube D', and pipes F K, all constructed and relatively arranged as shown in fig. 1 of the drawing, and for the purpose specified.

The above specification of my invention signed by me this 1st day of March, 1870.

JOHN GATES.

Witnesses:
 I. L. ATKINSON,
 L. M. PARRISH.